US012042452B2

(12) United States Patent
Wiggermann et al.

(10) Patent No.: US 12,042,452 B2
(45) Date of Patent: Jul. 23, 2024

(54) MICROCLIMATE MANAGEMENT SYSTEMS FOR DETECTING SURFACE PERFORMANCE

(71) Applicant: Hill-Rom Services, Inc., Batesville, IN (US)

(72) Inventors: Neal Wiggermann, Batesville, IN (US); Kathryn Smith, Batesville, IN (US); Frank Sauser, Batesville, IN (US); Susan Kayser, Batesville, IN (US); Mary L. Pfeffer, Batesville, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 144 days.

(21) Appl. No.: 17/711,377

(22) Filed: Apr. 1, 2022

(65) Prior Publication Data

US 2022/0331180 A1 Oct. 20, 2022

Related U.S. Application Data

(60) Provisional application No. 63/175,071, filed on Apr. 15, 2021.

(51) Int. Cl.
*A47C 21/04* (2006.01)
*A61G 7/057* (2006.01)

(52) U.S. Cl.
CPC ........ *A61G 7/05769* (2013.01); *A47C 21/044* (2013.01); *A61G 2203/46* (2013.01); *A61G 2210/70* (2013.01)

(58) Field of Classification Search
CPC ..... A47C 21/04; A47C 21/042; A47C 21/044; A47C 27/08; A47C 27/081; A47C 27/082; A47C 27/10; A61G 7/05769; A61G 7/05784
See application file for complete search history.

(56) References Cited

U.S. PATENT DOCUMENTS

| | | | | |
|---|---|---|---|---|
| 6,855,158 | B2 * | 2/2005 | Stolpmann | A61G 7/05776 607/108 |
| 8,745,784 | B2 | 6/2014 | Cole et al. | |
| 8,856,993 | B2 | 10/2014 | Richards et al. | |
| 9,730,847 | B2 | 8/2017 | Lachenbruch et al. | |
| 10,441,086 | B2 * | 10/2019 | Nunn | A47C 31/123 |
| 2010/0043143 | A1 | 2/2010 | O'Reagan et al. | |
| 2017/0049645 | A1 * | 2/2017 | Williams | A61G 7/05 |
| 2018/0042762 | A1 * | 2/2018 | Galer | A61F 7/02 |
| 2021/0204720 | A1 * | 7/2021 | Karschnik | A47C 27/081 |

FOREIGN PATENT DOCUMENTS

CN 107496115 A 12/2017

* cited by examiner

*Primary Examiner* — Benyam Haile
(74) *Attorney, Agent, or Firm* — Dinsmore & Shohl LLP

(57) ABSTRACT

A microclimate management system including a person support surface including one or more sensors, a fluid supply device coupled to an inlet of the person support surface and configured to supply fluid to an outlet the person support surface, and a controller configured to detect an inlet condition value at the inlet of the person support surface, detect an outlet condition value at the outlet of the person support surface, determine a difference between the inlet condition value and the outlet condition value, and transmit a first alert in response to determining that a rate of change of the difference between the inlet condition value and the outlet condition value is below a lower condition threshold.

20 Claims, 6 Drawing Sheets

MICROCLIMATE MANAGEMENT SYSTEMS FOR DETECTING SURFACE PERFORMANCE

CROSS-REFERENCE TO RELATED APPLICATION

This application is a non-provisional application and claims priority to U.S. Provisional Patent Application No. 63/175,071, filed Apr. 15, 2021, for "Microclimate Management Systems For Detecting Surface Performance," which is hereby incorporated by reference in its entirety including the drawings.

TECHNICAL FIELD

The present specification generally relates to systems and methods for detecting heat and moisture drawn from a person on a person support surface and, more specifically, systems and methods for identifying conditions conducive to the development of pressure injuries to a person on a person support surface based on an amount of heat and moisture drawn into the person support surface from the person.

BACKGROUND

Patients lying on person support surfaces, such as hospital bed mattresses, for extended periods of time are susceptible to the development of pressure ulcers (also known as decubitus ulcers or bedsores). Pressure ulcers are lesions often found adjacent bony or cartilaginous areas. Pressure ulcers may be caused by tissue forces, such as, for example, pressure (i.e., compression of tissues), shear force, and friction. Pressure ulcer formation may be exacerbated by the presence of excess body heat and/or moisture. In addition, pressure ulcer formation may be exacerbated when too many covers, for example, sheets, blankets, or other layers, are between the patient and a person support surface for an excessive period of time.

Accordingly, a need exists for improved systems and methods for determining when conditions are conducive to pressure injuries and providing an alert so that the conditions conducive to pressure injuries may be remediated.

SUMMARY

In one embodiment, a microclimate management system includes: a person support surface including one or more sensors; a fluid supply device coupled to an inlet of the person support surface and configured to supply fluid to the inlet of the person support surface such that the fluid is circulated to an outlet of the person support surface; and a controller operatively coupled to the fluid supply device and the one or more sensors of the person support surface, the controller configured to detect an inlet condition value of the fluid at the inlet of the person support surface with the one or more sensors; detect an outlet condition value of the fluid at the outlet of the person support surface with the one or more sensors; determine a difference between the inlet condition value and the outlet condition value; and transmit a first alert in response to determining that a rate of change of the difference between the inlet condition value and the outlet condition value is below a lower condition threshold.

In another embodiment, a person support apparatus includes: a lower frame; a lift mechanism coupled to the lower frame; an upper frame movably supported above the lower frame by the lift mechanism; a person support surface including one or more sensors; a fluid supply device coupled to an inlet of the person support surface and configured to supply fluid to the inlet of the person support surface such that the fluid is circulated to an outlet of the person support surface; and a controller operatively coupled to the fluid supply device and the one or more sensors of the person support surface, the controller configured to detect an inlet condition value of the fluid at the inlet of the person support surface with the one or more sensors; detect an outlet condition value of the fluid at the outlet of the person support surface with the one or more sensors; determine a difference between the inlet condition value and the outlet condition value; and transmit a first alert in response to determining that a rate of change of the difference between the inlet condition value and the outlet condition value is below a lower condition threshold.

In yet another embodiment, a method includes: supplying a fluid to an inlet of a person support surface such that the fluid is circulated to an outlet of the person support surface; detecting an inlet condition value of the fluid at the inlet of the person support surface with one or more sensors; detecting an outlet condition value of the fluid at the outlet of the person support surface with the one or more sensors; determining a difference between the inlet condition value and the outlet condition value; and transmitting a first alert in response to determining that a rate of change of the difference between the inlet condition value and the outlet condition value is below a lower condition threshold.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
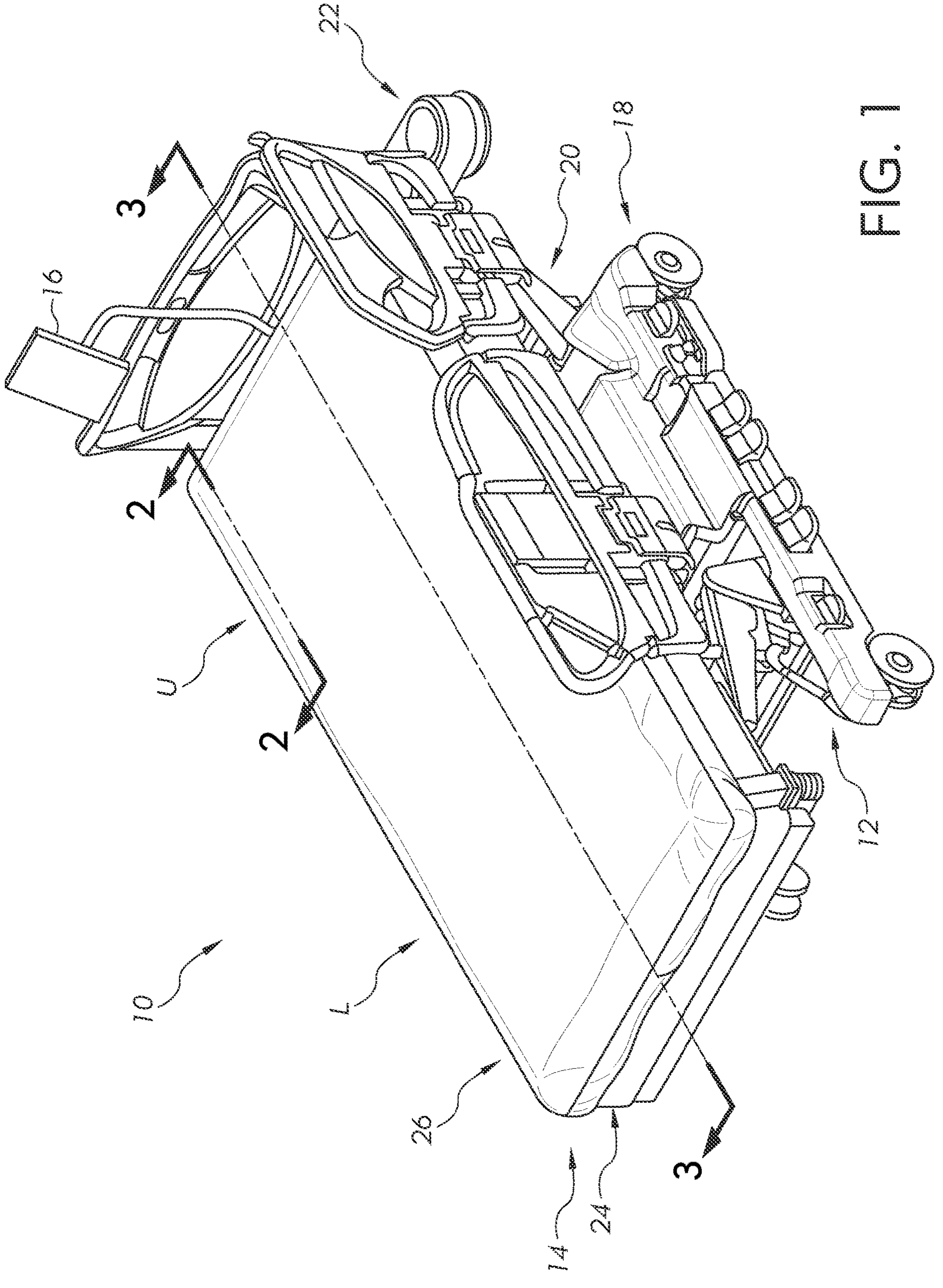
FIG. 1 schematically depicts a perspective view of a person support system, according to one or more embodiments shown and described herein.

Embodiments described herein are directed to microclimate management systems, person support apparatus, and methods for using same that identify whether too many or too few layers are between a person and a person support apparatus.

The microclimate management system includes a person support surface including one or more sensors, a fluid supply device coupled to an inlet of the person support surface and configured to supply fluid from the inlet of the person support surface to an outlet the person support surface, and a controller operatively coupled to the fluid supply device and the one or more sensors of the person support surface. The controller is configured to detect an inlet condition value of the fluid at the inlet of the person support surface and an outlet condition value of the fluid at the outlet of the person support surface with the one or more sensors. The controller is further configured to determine a difference between the inlet condition value and the outlet condition value and transmit an alert in response to determining that a rate of change of the difference between the inlet condition value and the outlet condition value is below a lower condition threshold. Various embodiments of the microclimate management system and the operation of the microclimate management system are described in more detail herein. Whenever possible, the same reference numerals will be used throughout the drawings to refer to the same or like parts.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or an apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Referring now to FIG. 1, a person support system 10 is illustrated according to one or more embodiments described herein. The person support system 10 includes person support apparatus 12, a support substrate 14 supported on the person support apparatus 12, and a fluid supply device 16 in communication with the support substrate 14. In one illustrative embodiment, the support substrate 14 and the fluid supply device 16 are part of a mattress replacement system.

The person support apparatus 12 includes a lower frame 18, one or more lift mechanisms 20 coupled to the lower frame 18, and an upper frame 22 movably supported above the lower frame 18 by the lift mechanisms 20. In an embodiment, the person support apparatus 12 is a hospital bed frame with a head or upper support section U where the head of a person (not shown) can be positioned, and a foot or lower support section L where the feet of the person can be positioned. The person support apparatus 12 can also be a stretcher, an operating room table, a wheel chair, or other person supporting structure.

Figure 2:
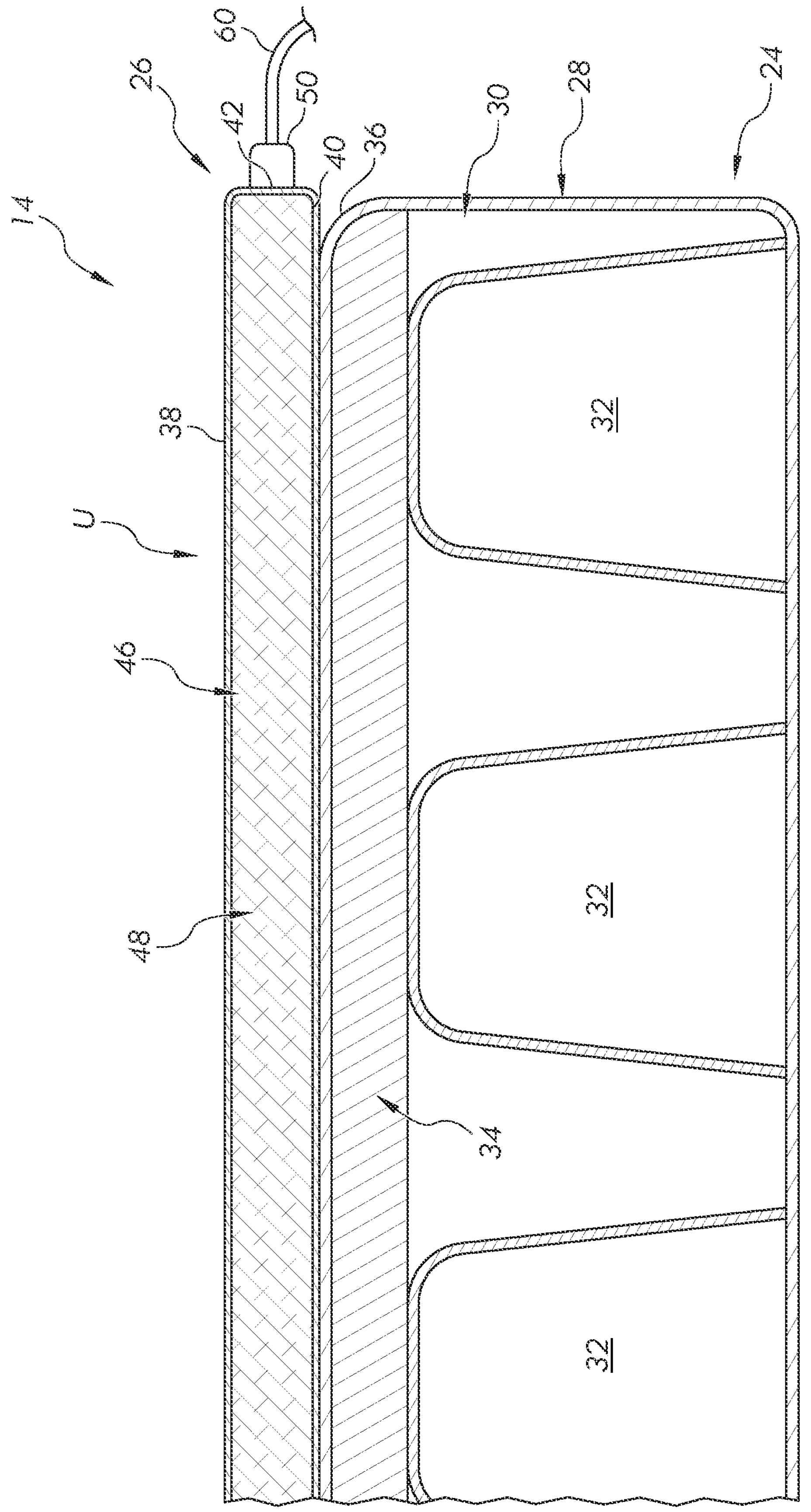
FIG. 2 schematically depicts a partial cross-sectional view taken along line 2-2 of FIG. 1 illustrating a support substrate of the person support system of FIG. 1, according to one or more embodiments shown and described herein.

As shown in FIGS. 1 and 2, the support substrate 14 includes a mattress 24 and a person support surface 26 positioned on the mattress 24 and/or integral with the mattress 24. In embodiments, the person support surface 26 can be positioned on an upper surface 36 of the mattress 24 and can be removably coupled to the mattress 24 by a plurality of fasteners (not shown), such as, buttons, snaps, Velcro®, ties, pins, zippers, or other known fasteners, to prevent movement of the person support surface 26 with respect to the mattress 24. It should be appreciated that the person support surface 26 can be integrally incorporated in the mattress 24 or can be configured to mimic the structure of the mattress 24.

As shown in FIG. 2, in embodiments, the mattress 24 includes an outer mattress ticking or mattress cover 28 that can define a mattress chamber 30. The mattress 24 also includes a mattress core 32 provided within the mattress cover 28. The mattress core 32 can be composed of a single type of material or a combination of materials and/or devices. In one illustrative embodiment, the mattress core 32 is composed of single density foam. In another illustrative embodiment, the mattress core 32 includes multiple zones of high-density foam configured to enhance pressure redistribution as a function of a person's body's proportional differences. In yet another illustrative embodiment, the mattress core 32 can include air bladders and/or air bladders with foam contained therewithin. In embodiments, the mattress 24 includes a mattress topper 34 enclosed by the mattress cover 28 and provided at the upper surface 36 of the mattress 24. In embodiments, the person support surface 26 is part of the mattress topper 34.

The person support surface 26 includes a top layer 38, a bottom layer 40, an inlet 42, an outlet 44 (FIG. 3), and a spacer material 46 provided between the top layer 38 and the bottom layer 40. In embodiments, the spacer material 46 may be a 3-dimensionally engineered spacer material. In embodiments, the top layer 38 and the bottom layer 40 are coupled together along their edges to form an inner chamber 48 therebetween, which contains the spacer material 46. In one illustrative embodiment, the edges of the top layer 38 and the bottom layer 40 are coupled together using RF welding technology. At least a portion of the top layer 38 and the bottom layer 40 are both configured to be vapor permeable and air impermeable. This configuration prevents air passing through the person support surface 26 from impinging on the skin of a person positioned on the person support surface 26 while allowing the moisture produced by the person to pass through the top layer 38 and be exhausted with the fluid passing through the person support surface 26 and out through the outlet 44.

Figure 3:
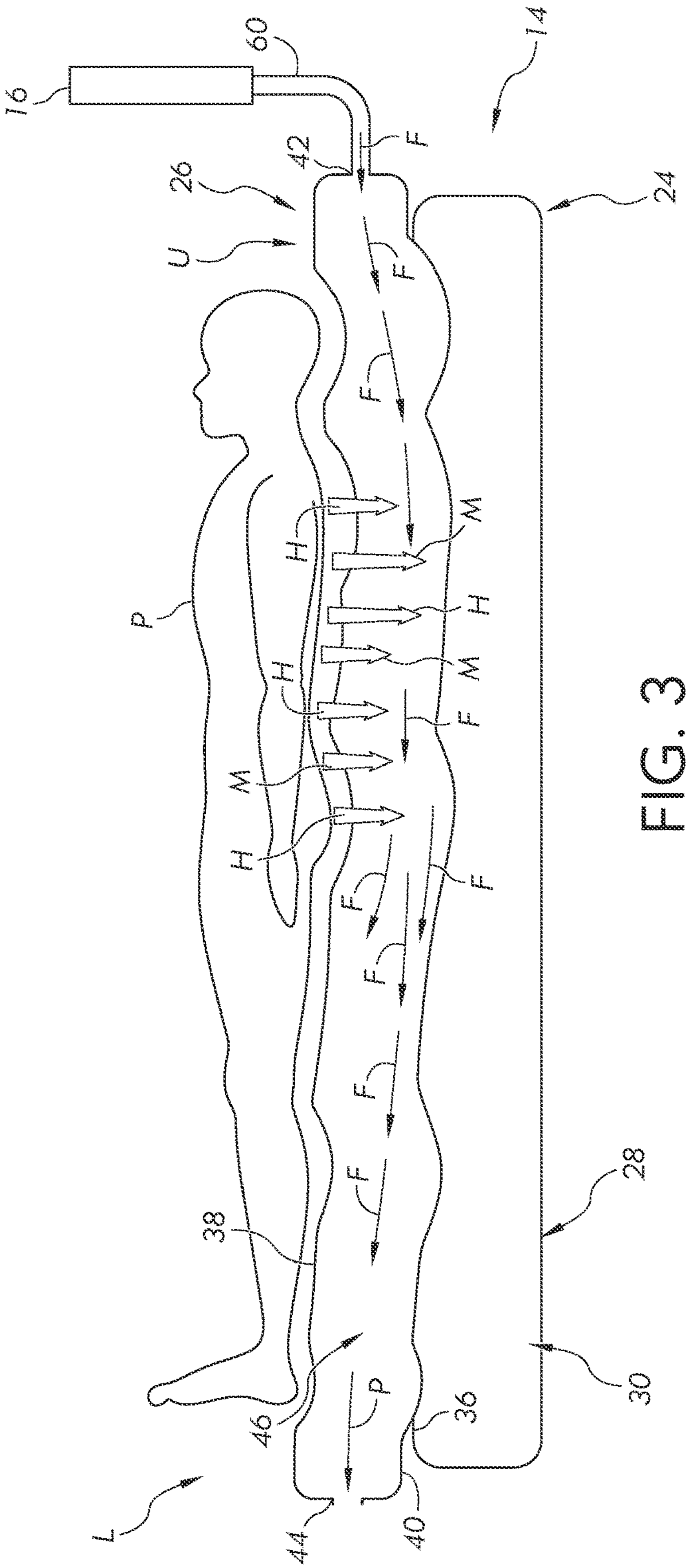
FIG. 3 schematically depicts a cross-sectional view taken along line 3-3 of FIG. 1 illustrating a flow of fluid through the support substrate, according to one or more embodiments shown and described herein.

The spacer material 46 is positioned in the inner chamber 48 and is air and moisture permeable as shown in FIG. 3. The spacer material 46 provides a path for the air to flow through when a person P is supported on the person support surface 26. As shown in FIG. 3, the person P is lying on the top layer 38 of the person support surface 26 in the supine position. As fluid F, such as air, from the fluid supply device 16 is supplied to the person support surface 26 through the inlet 42 at the upper section U proximate a first end of the person support surface 26 and through the spacer material 46, the fluid F draws heat H and moisture M into the person support surface 26 from the person P and the environment surrounding the person P. The flow of the fluid F collects the heat H and moisture M drawn into the person support surface 26 directs the collected heat H and moisture M toward the lower section L of the person support surface 26 and out through the outlet 44. In FIG. 3, the fluid F is depicted as horizontal arrows and the heat H and moisture M are depicted as vertical arrows. However, it should be appreciated that the horizontal arrows depicting the fluid F include the collected heat H and moisture M as the fluid F passes in proximity to the person P. As described in more detail herein, data regarding the difference between the amount of heat H and moisture M detected at the inlet 42 of the person support surface 26 and the amount of heat H and moisture M detected at the outlet 44 of the person support surface 26 is utilized to determine whether too many or too few covers or layers are placed between the person P and the person support surface 26.

In embodiments, the resistance to flow of the spacer material 46 when fluid F is supplied to the person support surface 26 at a rate of 2.2 $ft^3$/min. can be less than about 1 (lb/$in^2$)/($ft^3$/min.). In one illustrative embodiment, the resistance to flow for the spacer material 46 can be between about 0.1 (lbs./$in^2$)/($ft^3$/min.) and 0.7 (lbs./$in^2$)/($ft^3$/min.). It should be appreciated that the resistance to flow can be more than 1 (lb/$in^2$)/($ft^3$/min.). It should be appreciated that the moisture vapor transfer rate through the spacer material 46 can be between 25 g/$m^2$-hr and 200 g/$m^2$-hr. Where spacer material 46 is composed of SpaceNet®, the thickness of the spacer material 46 can be between about 0.1 in. and 0.75 in. It should be appreciated that the thickness of the spacer material 46 can be greater than 0.75 in.

Figure 4:
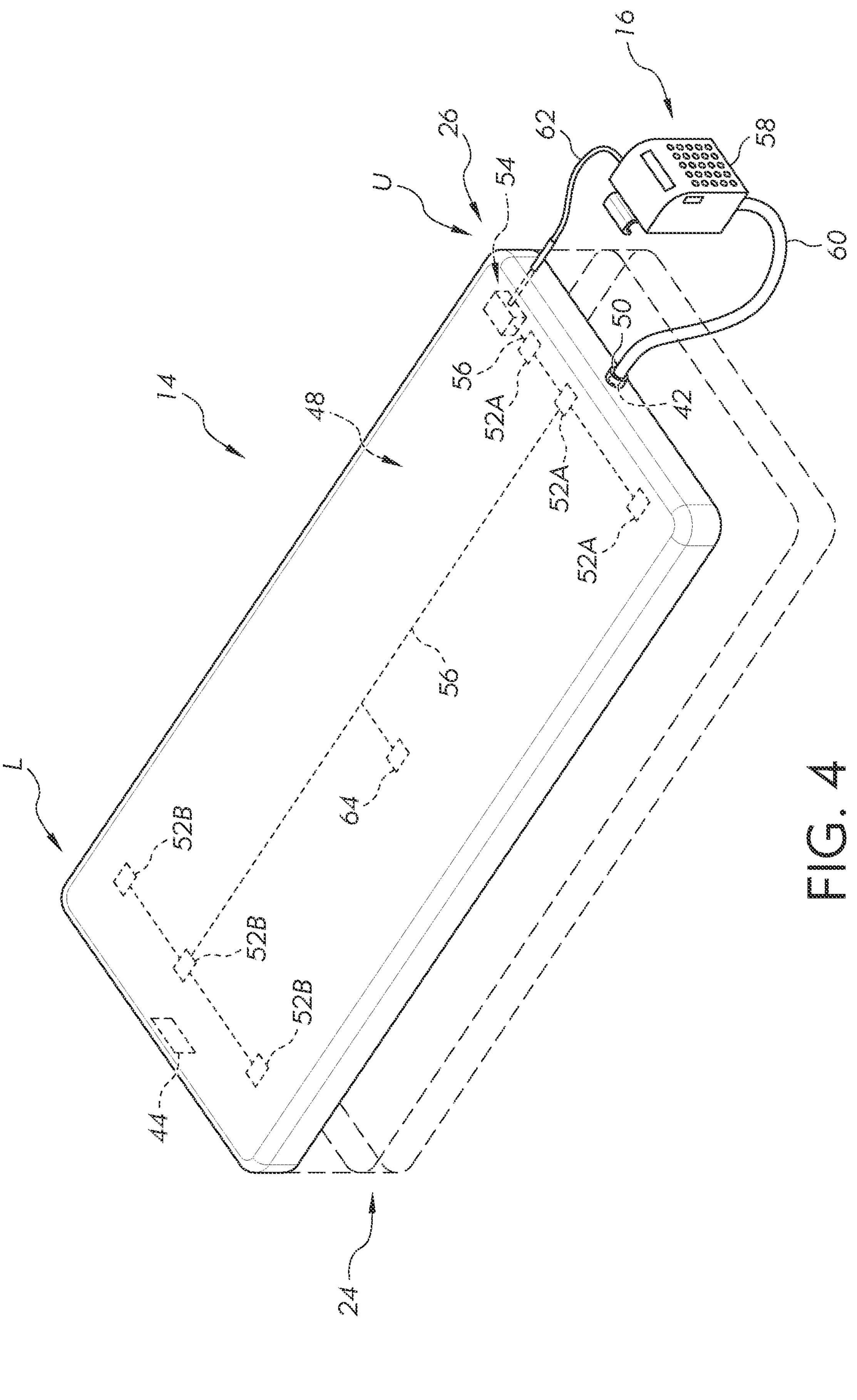
FIG. 4 schematically depicts a perspective view of the support substrate of FIG. 1, according to one or more embodiments shown and described herein.

As discussed herein and referring now to FIG. 4, the inlet 42 and the outlet 44 of the person support surface 26 and allow the fluid F to be communicated into the inner chamber 48 of the person support surface 26 and exhausted from the person support surface 26, respectively. In embodiments, the inlet 42 and the outlet 44 are generally located on opposite ends of the person support surface 26. In one illustrative embodiment, the inlet 42 is located at an end of the upper section U of the person support surface 26 and the outlet 44 is located at an opposite end of the lower section L of the person support surface 26. In embodiments, the inlet 42 includes an inlet connector 50 configured to couple to and receive fluid from the fluid supply device 16.

Referring still to FIG. 4, one or more sensors may be located within the inner chamber 48 and, in some embodiments, within the spacer material 46 of the person support surface 26. In embodiments, one or more inlet sensors 52A may be located at, near, or in the inlet 42 and one or more outlet sensors 52B may be located at or near the outlet 44. As depicted, three inlet sensors 52A are provided within the inner chamber 48 at the upper section U and three outlet sensors 52B are provided within the inner chamber 48 at the lower section L. However, this configuration is shown for illustrative purposes only and not intended to be limiting to the present disclosure. As such, any number of inlet sensors 52A and outlet sensors 52B may be provided and, similarly, any number of additional sensors may be provided throughout the person support surface 26 between the upper section U and the lower section L. The one or more inlet sensors 52A and the one or more outlet sensors 52B may be generally referred to herein as sensors 52. The sensors 52 can be any suitable temperature sensor and/or moisture sensor that can be adapted to generate signals corresponding to the temperature and humidity flowing through the person support surface 26. In embodiments, the sensors 52 may include a printed circuit thermometer embedded within the one or more layers of the person support surface 26. The sensors 52 may be operatively coupled to one another and to a controller 54 via a wire 56. In other embodiments, the sensors 52 may wirelessly communicate with the controller 54. In other embodiments, the sensors 52 may include one or more cameras, thermal imaging sensors, proximity sensors, or any combination thereof. The sensors 52 may be integrated into the person support surface 26 or separate therefrom such that the sensors 52 may be positionable relative to the person support surface 26 and the person P.

Referring still to FIG. 4, in embodiments, the fluid supply device 16 includes a pump 58 for drawing in fluid, for example, air, and a conduit 60 for delivering the fluid to the fluid supply device 16. As such, the conduit 60 interconnects the pump 58 of the fluid supply device 16 and the inlet 42 of the person support surface 26. More particularly, the conduit 60 mates with the inlet connector 50 at the inlet 42 to form an airtight connection with the person support surface 26. As shown, the controller 54 may be communicatively coupled to the fluid supply device 16 via a cable 62. Alternatively, the controller 54 may wirelessly communicate with the fluid supply device 16. Thus, as discussed in more detail herein, the controller 54 may be configured to operate the fluid supply device 16 between an activated state in which the fluid supply device 16 supplies fluid to the person support surface 26, and a deactivated state in which fluid is not supplied to the person support surface 26.

In embodiments, the fluid supply device 16 may be configured to operate only when it is detected that a person is placed on the person support surface 26. In this embodiment, the fluid supply device 16, and/or the controller 54 may communicate with one or more load sensors 64 for detecting when a person is on the person support surface 26. The one or more load sensors 64 may be positioned on or within the person support surface 26. In addition, the one or more load sensors 64 may be configured to detect movement of the person to identify when the person is in at rest position, i.e., the sensors have not detected movement exceeding a threshold for a predetermined period of time. Further, a plurality of load sensors 64 may be provided and spaced apart from one another to identify a particular position in which the person is situated. In embodiments, the fluid supply device 16 may be configured to deliver fluid to the person support surface 26 only when the person is not moving and/or when the person is in a predetermined position, such as a supine position, as determined with the one or more load sensors 64.

Referring still to FIG. 4, the controller 54 is configured to control the operation of the fluid supply device 16 and determine when too many or too few covers are placed between the person support surface 26 and the person P atop the person support surface 26, as discussed in more detail herein. In embodiments discussed herein, the controller 54 activates and/or deactivates the fluid supply device 16 when a person is positioned on the person support surface 26 and, in some embodiments, in a predetermined position. The controller 54 may also be configured to cause the fluid supply device 16 to supply fluid at a predetermined rate and/or adjust the temperature and humidity of the fluid supplied by the fluid supply device 16. In other illustrative embodiments, the controller 54 can activate/deactivate the fluid supply device 16 when the person moves out of a particular position on the fluid supply device 16.

Figure 5:
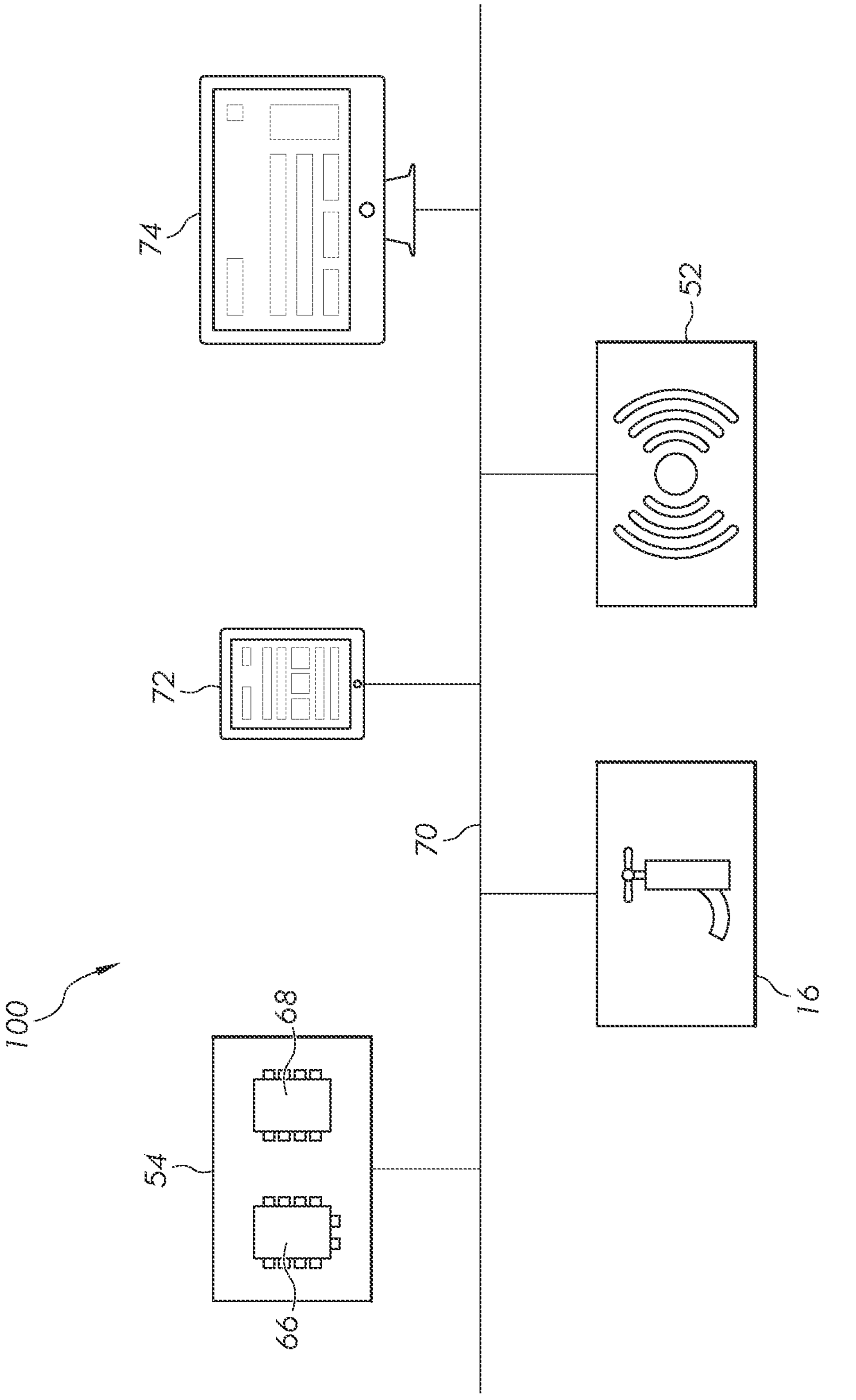
FIG. 5 schematically depicts components of a microclimate management system, according to one or more embodiments shown and described herein.

Referring now to FIG. 5, components of a microclimate management system 100 are illustrated. Although not illustrated in FIG. 5, it should be understood that the microclimate management system 100 may include the person support surface 26 or may be a standalone system utilized as a retrofit or incorporated onto or into an existing person support assembly, such as the person support system 10.

As shown, in embodiments, the microclimate management system 100 includes the fluid supply device 16, the sensors 52, and the controller 54. The controller 54 includes one or more processors 66 and one or more memory modules 68. Each of the one or more processors 66 may be any device capable of executing machine readable and executable instructions. Accordingly, each of the one or more processors 66 may be an integrated circuit, a microchip, a computer, or any other computing device. The one or more processors 66 are coupled to a communication path 70 that provides signal interconnectivity between various modules of the microclimate management system 100. In embodiments, the communication path 70 may include the wire 56 and/or cable 62 shown in FIG. 4. The communication path 70 may communicatively couple any number of processors 66 with one another, and allow the modules coupled to the communication path 70 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

The one or more memory modules 68 may comprise RAM, ROM, flash memories, hard drives, or any device capable of storing machine readable and executable instructions such that the machine readable and executable instructions can be accessed by the one or more processors 66. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 68. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The communication path 70 may be formed from any medium that is capable of transmitting a signal such as, for example, conductive wires, conductive traces, optical waveguides, or the like. In some embodiments, the communication path 70 may facilitate the transmission of wireless signals, such as WiFi, Bluetooth®, Near Field Communication (NFC) and the like. Moreover, the communication path 70 may be formed from a combination of mediums capable of transmitting signals. In one embodiment, the communication path 70 comprises a combination of conductive traces, conductive wires, connectors, and buses that cooperate to permit the transmission of electrical data signals to components such as processors, memories, sensors, input devices, output devices, and communication devices. Accordingly, the communication path 70 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

In embodiments, the microclimate management system 100 also includes an input device 72. The input device 72 may be communicatively coupled to the controller 54 and other components of the microclimate management system 100 via the communication path 70. The input device 72 includes one or more controls for operating the microclimate management system 100 such as, for example, inputting one or more physiological attributes of the person P, as discussed in more detail herein. The one or more controls may be any suitable user operating controls such as, for example, buttons or tactile input on a touchscreen device.

In embodiments, the microclimate management system 100 also includes a notification device 74 for providing a visual and/or audible output in response to the controller 54 determining that too many or too few covers are placed between the person P and the person support surface 26. The notification device 74 is coupled to the communication path 70 and communicatively coupled to the one or more processors 66. The notification device 74 may include any medium capable of transmitting an optical output such as, for example, a cathode ray tube, light emitting diodes, a liquid crystal display, a plasma display, or the like. Moreover, the notification device 74 may be a touchscreen that, in addition to providing optical information, detects the presence and location of a tactile input upon a surface of or adjacent to the display. Accordingly, the notification device 74 may receive mechanical input directly upon the optical output provided by the notification device 74. As such, the input device 72 may be incorporated into the notification device 74. The notification device 74 may also include a speaker for transforming data signals into mechanical vibrations, such as to output audible prompts or audible information.

As discussed herein, embodiments of the present disclosure may be utilized to determine an optimal amount of covers or layers, for example, sheets, blankets, pads, and the like, that should be placed under a person positioned on the person support surface 26 to reduce the potential for pressure injuries, while still maintaining a stable body temperature of the person. Reference to an "acceptable" amount of covers is based on a determined reference line R illustrated in FIG. 6 and discussed in more detail herein. It should be appreciated that the number of covers, as well as the thickness and material of the covers, relate to the rate of change in temperature and humidity based on an amount of heat and moisture that is drawn into the person support surface 26 by the fluid supply device 16. For example, when too many covers are provided on the person support surface 26 or the covers are formed from a less breathable material, this creates an obstruction on the top layer 38 of the person support surface 26. This results in a slower draw of heat H and moisture M into the person support surface 26 as would be exhibited by less covers or more breathable covers being provided. It should be appreciated that any reference to the number of covers is equally applicable to the thickness or breathability of the covers. Specifically, reference to too many covers includes covers that are too thick or less breathable, while reference to too few covers includes covers that are too thin or too breathable.

Figure 6:
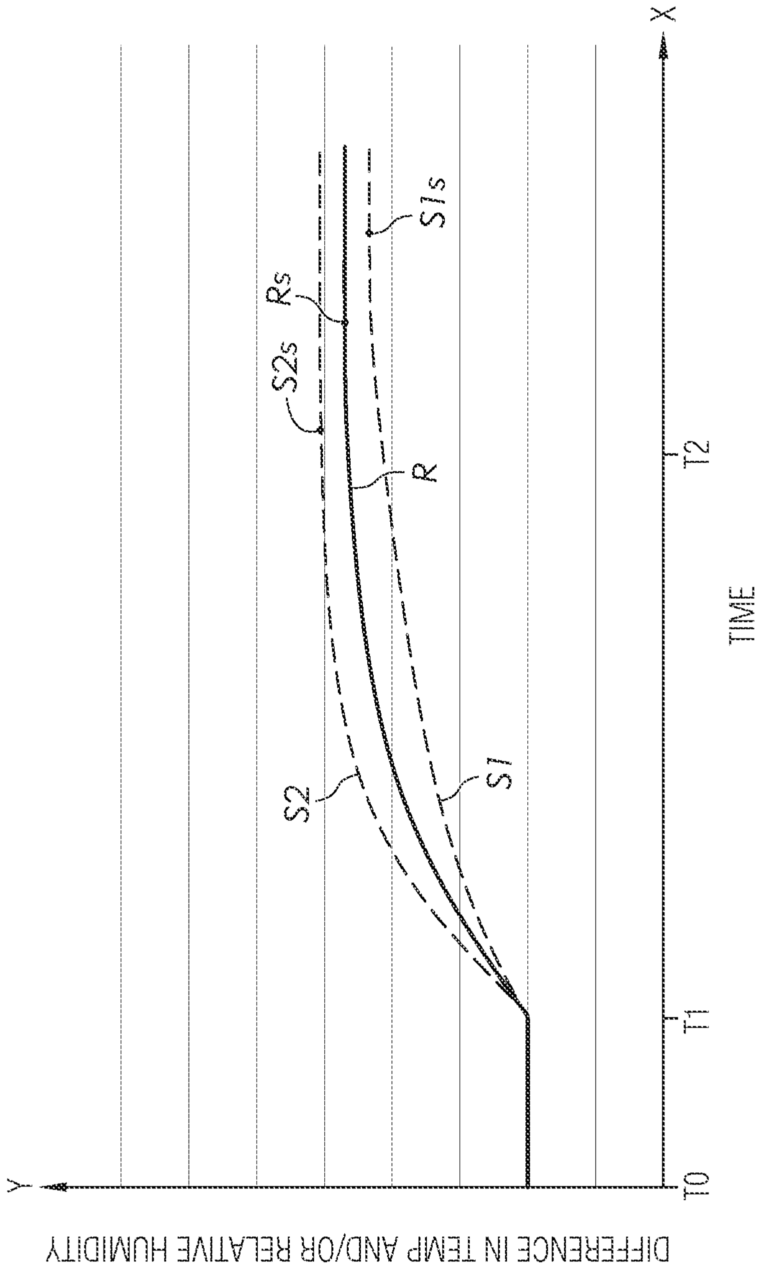
FIG. 6 schematically depicts a chart of recorded data indicating changes in a difference in temperature and humidity between an inlet of the support substrate and an outlet of the support substrate, according to one or more embodiments shown and described herein.

Referring now to FIG. 6, and with reference to the person support system 10 and the microclimate management system 100 illustrated in FIGS. 1-5, a chart is illustrated indicating a difference in a condition between the inlet 42 of the person support surface 26 and the outlet 44 of the person support surface 26. The X-axis of the chart indicates an elapsed time and the Y-axis of the chart indicates a difference in a condition of the fluid detected at the inlet 42 of the person support surface 26, i.e., an inlet condition value of the fluid, and a condition of the fluid detected at the outlet 44 of the person support surface 26, i.e., an outlet condition value of the fluid. The condition may be based on at least one of a temperature and a humidity of the fluid. In embodiments, the condition is based on a detected temperature of the fluid. In other embodiments, the condition is based on a detected humidity of the fluid. In yet other embodiments, the condition is based on a function of both a detected temperature and a detected humidity of the fluid. Accordingly, the inlet sensor 52A detects the condition at or near the inlet 42 of the person support surface 26 to determine the inlet condition value of the fluid, and the outlet sensor 52B detects the condition at or near the outlet 44 of the person support surface 26 to determine the outlet condition value of the fluid. The difference between the inlet condition value and the outlet condition value is recorded as data points by the controller 54 to determine a rate of change of the difference over time. The rate of change of the difference is determined by evaluating the slope of the recorded data points.

As shown in FIG. 6, a reference line R is illustrated on the chart as a solid line. The reference line R indicates an optimal rate of change of the difference between the inlet condition value and the outlet condition value. The reference line R is utilized to identify a situation in which too many covers are placed between the person P and the person support surface 26 and/or a situation in which too few covers are placed on the person support surface 26. Alternatively, an upper condition threshold and a lower condition threshold, not shown, may be provided above and below the reference line R, respectively, to indicate an range of an optimal rate of change within which it may be determined that an acceptable amount of covers is provided. It should be appreciated that the upper condition threshold and the lower condition threshold are dependent on an elapsed time since activation of the fluid supply device 16 to supply fluid into the person support surface 26. In embodiments in which no range is present, the upper threshold and the lower threshold may be the same. The reference line R may be determined based on an algorithm that takes into condition one or more physiological attributes of the person atop the person support surface 26, which may be inputted by operating the input device 72. The one or more physiological attributes may include age, weight, height, vitals, body mass index (BMI), and the like to create a reference line that is specifically tailored to the person on the person support surface 26. The input device 72 then transmits the data to the controller 54 to adjust the algorithm. In embodiments, the one or more physiological attributes may be detected by one or more sensors or external devices communicating with the person, such as an external monitor, the one or more load sensors 64, and the like.

Referring still to FIG. 6, at time T1, a person, such as person P, is positioned on the person support surface 26 and the fluid supply device 16 is not activated. Thus, between time T0 and time T1, a horizontal line is depicted in the reference line R indicating that the difference between the inlet condition value detected by the inlet sensor 52A at the inlet 42 and the outlet condition value detected by the outlet sensor 52B at the outlet 44 remains constant and does not change. With the fluid supply device 16 in the deactivated state, no heat H or moisture M is drawn into the person support surface 26. At time T1, the person P is positioned on the person support surface 26 and the covers, and the fluid supply device 16 is switched to the activated state by the controller 54. As discussed herein, the fluid supply device 16 may be configured to activate in response to the one or more load sensors 64 detecting the presence of the person P on the person support surface 26. The presence of the person P may be detected when the one or more load sensors 64 detect a load on the person support surface 26 above a load threshold. Alternatively or in addition, the fluid supply device 16 may be configured to delay activation until it is determined by receiving data from the one or more load sensors 64 that the person P on the person support surface 26 is in a predetermined position, for example, a supine position as opposed to on his or her side. In embodiments, after the fluid supply device 16 is placed in the activated state, the fluid supply device 16 or at least the recording of the data points by the controller 54 may be paused when it is determined that the person P has moved out of the predetermined position. When it is determined that the person P returns to the predetermined position, the fluid supply device 16 and/or the recording of the data points may be resumed. This reduces the likelihood that noise, i.e., inaccurate data, will be detected and recorded by the controller 54 while the person P is changing positions on the person support surface 26.

Between time T1 and time T2, with the person P on the person support surface 26 and the fluid supply device 16 activated, heat H and moisture M is drawn into the person support surface 26 and directed toward the outlet 44, as shown in FIG. 3. Thus, the inlet condition value detected by the inlet sensor 52A may remain substantially unchanged while the outlet condition value detected by the outlet sensor 52B increases (or decreases) based on the increased amount of heat H and moisture M drawn into the person support surface 26 and detected by the outlet sensor 52B. As a result, the difference between the inlet condition value and the outlet condition value increases, as shown by the reference line R indicating a change in the difference initiated at time T1.

Further, as shown in FIG. 6, the rate at which the reference line R changes between time T1 and time T2 decreases as the change in temperature and humidity at the outlet 44 of the person support surface 26 stabilizes. Stated another way, the temperature and humidity detected at the outlet 44 of the person support surface 26 changes more rapidly at time T1, indicated by a greater slope, as compared to the change in temperature and humidity detected at the outlet 44 at time T2, which is indicated by a smaller slope. Thus, at time T2, after the fluid supply device 16 has been operating for a particular amount of time, the reference line R approaches a point of steady state Rs at which the rate of change of the difference between the inlet condition value and the outlet condition value falls below a threshold value.

As discussed herein, the microclimate management system 100 may be configured to determine whether the too many covers or too few covers are placed between the person P and the person support surface 26 based on the detected rate of change of the difference between the inlet condition value and the outlet condition value. In addition, the microclimate management system 100 may be configured to determine that too many or too few covers are placed under the person P based on a time at which a steady state in the rate of change has been reached.

As shown in FIG. 6, a first scenario S1 depicts a non-limiting example of a scenario when a person, such as person P, is placed on the person support surface 26 and the fluid supply device 16 is activated at time T1. Here, the rate of change of the difference between the inlet condition value and the outlet condition value during the first scenario S1 is shown to be less between time T1 and time T2 than the rate of change of the reference line R between time T1 and time T2. Thus, the controller 54 may be determined at any point between time T1 and time T2 that too many covers are placed on the person support surface 26 as less heat H and moisture M is being drawn into the person support surface 26 by the fluid supply device 16. This is due to the fact that the additional covers are functioning as an obstacle that slows the flow of heat H and moisture M into the person support surface 26. Alternatively, it may be determined that too many covers are provided in the first scenario S1 based on the time in which it takes to reach the steady state S1s, i.e., the rate of change falls below the predetermined threshold. In the first scenario S1, the time it takes to reach the steady state S1s would be greater than the time to reach steady state Rs in the reference line R due to the fact that there is more resistance to heat H and moisture M being drawn into the person support surface 26 by the excessive amount of covers.

Referring still to FIG. 6, a second scenario S2 depicts another non-limiting example of a scenario in which a person, such as person P, is placed on the person support surface 26 and the fluid supply device 16 is activated at time T1. The rate of change of the difference between the inlet condition value and the outlet condition value during the second scenario S2 is shown to be greater between time T1 and time T2 than the rate of change of the reference line R between time T1 and time T2. Thus, the controller 54 may determine at any point between time T1 and time T2 that too few or not enough covers are placed on the person support surface 26 as more heat H and moisture M is being drawn into the person support surface 26 by the fluid supply device 16. This is due to the fact that the lack of covers permit additional heat H and moisture M to be drawn into the person support surface 26. Alternatively, it may be determined that too few or not enough covers are provided in the second scenario S2 based on the time in which it takes to reach the steady state S2s, i.e., the rate of change falls below a predetermined threshold. In the first second S2, it should be appreciated that the time it takes to for the rate of change reach the steady state S2s would be less than the time to reach steady state Rs in the reference line R due to the fact that there is less resistance to heat H and moisture M being drawn into the person support surface 26 by the lack of covers.

In embodiments, the notification device 74 is configured to provide one or more alerts or a notifications in response to detecting that the rate of change is above or below the reference line R, or the optimal range provided by the reference line R. For example, if it is determined that the rate of change of the difference is below that of the reference line R or it takes longer to reach steady state, such as that exhibited during the first scenario S 1, the notification device 74 will provide a first alert indicating that too many covers are provided under the person P. The first alert may be an audible alert and/or a visual alert specifically indicating that covers should be removed from under the person P. Alternatively, if it is determined that the rate of change of the difference is above that of the reference line R or steady state is reached sooner, such as that exhibited during the second scenario S2, the notification device 74 will provide a second alert indicating that too few covers are provided under the person P. The second alert may be an audible alert and/or a visual alert specifically indicating that covers should be placed under the person P to reduce the risk of a pressure injury.

In embodiments, the microclimate management system 100 may be further configured to identify an incontinence event. Specifically, when it is determined that the rate of change of the difference between the inlet condition value and the outlet condition value is above a moisture threshold, it may be determined that an incontinence event has occurred. When it is determined that an incontinence event has occurred, the notification device 74 may provide a third alert, which may be an audible and/or visual alert, indicating the presence of the incontinence event and that the person P on the person support surface 26 should be inspected. Further, when it is determined that an incontinence event has occurred, the fluid supply device 16 may be deactivated to prevent drawing additional moisture into the person support surface 26. The fluid supply device 16 may be reactivated when the detected moisture level falls back below the moisture threshold.

From the above, it is to be appreciated that defined herein are microclimate management systems, person support apparatus, and methods for identifying whether too many or too few covers are placed between a person and the person support apparatus. In response to identifying whether too many or too few covers are provided, a corresponding alert is transmitted to notify a user so that appropriate action may be taken to reduce the likelihood of pressure injuries to the person.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. A microclimate management system comprising:

a person support surface including an inlet sensor provided within the person support surface at a first end of the person support surface and an outlet sensor provided within the person support surface at a second end of the person support surface opposite the first end of the person support surface;

a fluid supply device coupled to an inlet of the person support surface and configured to supply fluid to the inlet of the person support surface such that the fluid is circulated to an outlet of the person support surface; and a controller operatively coupled to the fluid supply device, the inlet sensor of the person support surface, and the outlet sensor of the person support surface, the controller configured to:

determine a reference line indicating an optimal rate of change, the reference line reaching a steady state at a first time;

detect an inlet condition value of the fluid at the inlet of the person support surface with the inlet sensor;

detect an outlet condition value of the fluid at the outlet of the person support surface with the outlet sensor;

determine a difference between the inlet condition value and the outlet condition value; and transmit a first alert in response to determining that a rate of change of the difference between the inlet condition value and the outlet condition value falls below a lower condition threshold after the first time.

2. The microclimate management system of claim 1, wherein the controller is further configured to transmit a second alert in response to determining that the rate of change of the difference between the inlet condition value and the outlet condition value is above an upper condition threshold.

3. The microclimate management system of claim 1, wherein the inlet condition value and the outlet condition value are determined based on one or more of a temperature and a humidity of the fluid detected at the inlet and the outlet of the person support surface, respectively.

4. The microclimate management system of claim 1, wherein the inlet is provided at a first end of the person support surface and the outlet is provided at an opposite end of the person support surface.

5. The microclimate management system of claim 2, wherein the upper condition threshold and the lower condition threshold are dependent on an elapsed time after the fluid supply device is activated to supply fluid into the person support surface.

6. The microclimate management system of claim 2, further comprising:
- an input device communicatively coupled to the controller and configured to receive one or more physiological attributes of a person supported on the person support surface,
- wherein the upper condition threshold and the lower condition threshold are adjusted based on the one or more physiological attributes.

7. The microclimate management system of claim 6, further comprising:
- one or more load sensors communicatively coupled to the controller and provided at the person support surface,
- wherein the controller is configured to activate the fluid supply device in response to the load sensor detecting a load above a load threshold.

8. A person support apparatus comprising:
- a lower frame;
- a lift mechanism coupled to the lower frame;
- an upper frame movably supported above the lower frame by the lift mechanism;
- a person support surface provided on the upper frame, the person support surface including an inlet sensor provided within the person support surface at a first end of the person support surface and an outlet sensor provided within the person support surface at a second end of the person support surface opposite the first end of the person support surface;
- a fluid supply device coupled to an inlet of the person support surface and configured to supply fluid to the inlet of the person support surface such that fluid is circulated to an outlet of the person support surface; and
- a controller operatively coupled to the fluid supply device the inlet sensor of the person support surface, and the outlet sensor of the person support surface, the controller configured to:
  - determine a reference line indicating an optimal rate of change, the reference line reaching a steady state at a first time;
  - detect an inlet condition value of the fluid at the inlet of the person support surface with the inlet sensor;
  - detect an outlet condition value of the fluid at the outlet of the person support surface with the outlet sensor;
  - determine a difference between the inlet condition value and the outlet condition value; and
  - transmit a first alert in response to determining that a rate of change of the difference between the inlet condition value and the outlet condition value falls below a lower condition threshold after the first time.

9. The person support apparatus of claim 8, wherein the controller is further configured to transmit a second alert in response to determining that the rate of change of the difference between the inlet condition value and the outlet condition value is above an upper condition threshold.

10. The person support apparatus of claim 8, wherein the inlet condition value and the outlet condition value are determined based on one or more of a temperature and a humidity of the fluid detected at the inlet and the outlet of the person support surface, respectively.

11. The person support apparatus of claim 8, wherein the inlet is provided at a first end of the person support surface and the outlet is provided at an opposite end of the person support surface.

12. The person support apparatus of claim 9, wherein the upper condition threshold and the lower condition threshold are dependent on an elapsed time after the fluid supply device is activated to supply fluid into the person support surface.

13. The person support apparatus of claim 9, further comprising:
- an input device communicatively coupled to the controller and configured to receive one or more physiological attributes of a person supported on the person support surface,
- wherein the upper condition threshold and the lower condition threshold are adjusted based on the one or more physiological attributes.

14. The person support apparatus of claim 13, further comprises:
- one or more load sensors communicatively coupled to the controller and provided at the person support surface,
- wherein the controller is configured to activate the fluid supply device in response to the load sensor detecting a load above a load threshold.

15. A method comprising:
- determining a reference line indicating an optimal rate of change, the reference line reaching a steady state at a first time;
- supplying a fluid to an inlet of a person support surface such that the fluid is circulated to an outlet of the person support surface;
- detecting an inlet condition value of the fluid at the inlet of the person support surface with an inlet sensor provided within the person support surface at a first end of the person support surface;
- detecting an outlet condition value of the fluid at the outlet of the person support surface with an outlet sensor provided within the person support surface at a second end of the person support surface opposite the first end of the person support surface;
- determining a difference between the inlet condition value detected by the inlet sensor and the outlet condition value detected by the outlet sensor; and
- transmitting a first alert in response to determining that a rate of change of the difference between the inlet condition value and the outlet condition value falls below a lower condition threshold before the first time.

16. The method of claim 15, further comprising transmitting a second alert in response to determining that the rate of change of the difference between the inlet condition value and the outlet condition value is above an upper condition threshold.

17. The method of claim 16, wherein the inlet condition value and the outlet condition value are determined based on one or more of a temperature and a humidity of the fluid detected at the inlet and the outlet of the person support surface, respectively.

18. The method of claim 16, wherein the lower condition threshold and the upper condition threshold are dependent on an elapsed time after a fluid supply device is activated to supply fluid into the person support surface.

19. The method of claim 16, further comprising transmitting a third alert in response to determining that the rate of change of the difference between the inlet condition value and the outlet condition value is above a moisture threshold, the third alert indicating an incontinence event is detected.

20. The method of claim 15, further comprising:

pausing the determining of the rate of change of the difference between the inlet condition value and the outlet condition value until it is determined that a person on the person support surface is in a predetermined position.

* * * * *